April 7, 1970 C. RUETSCHI 3,505,494
APPARATUS FOR WELDING SMALL ELEMENTS
Filed Jan. 17, 1967 3 Sheets-Sheet 1

United States Patent Office 3,505,494
Patented Apr. 7, 1970

3,505,494
APPARATUS FOR WELDING SMALL ELEMENTS
Charles Reutschi, Rue Jaquet-Droz 47,
La Chaux-de-Fonds 2300, Switzerland
Filed Jan. 17, 1967, Ser. No. 609,922
Claims priority, application Germany, May 10, 1966,
R 43,236
Int. Cl. B23k 9/20, 9/22
U.S. Cl. 219—98                                    6 Claims

ABSTRACT OF THE DISCLOSURE

A welding apparatus is described for time sequence actuation of current application to small workpieces. A current source of predetermined energy content is utilized with impact actuation for drawing or extinguishing a welding arc of short duration.

This invention relates generally to welding apparatus. In the welding of small work-pieces, it is necessary to heat to a high temperature for only a short time the parts to be welded together, in order to prevent undesirable heating and possible deformation of surrounding areas of the workpieces. Where the workpieces to be welded are thin, the welding pressure must be reduced, while maintaining the welding zone sufficiently fluid for the welding operation. The apparatus of the present invention includes novel work advancing means which permits the obtaining of exactly predetermined and reproducible welding times with an arc-duration of only a few hundred microseconds.

In accordance with the invention the welding apparatus thereof has an automatically operated advance device for one of the two parts to be welded together and has means which cause the ignition of the arc in a predetermined time period before the two parts come together, said device also has means for closing an electrical switch and gives a certain velocity to one of the parts for a predetermined time period before the two parts come into contact while the welding circuitry causes the welding arc to be turned off at a predetermined time.

The invention will be better understood by reference to the annexed drawings wherein.

Figure 1:
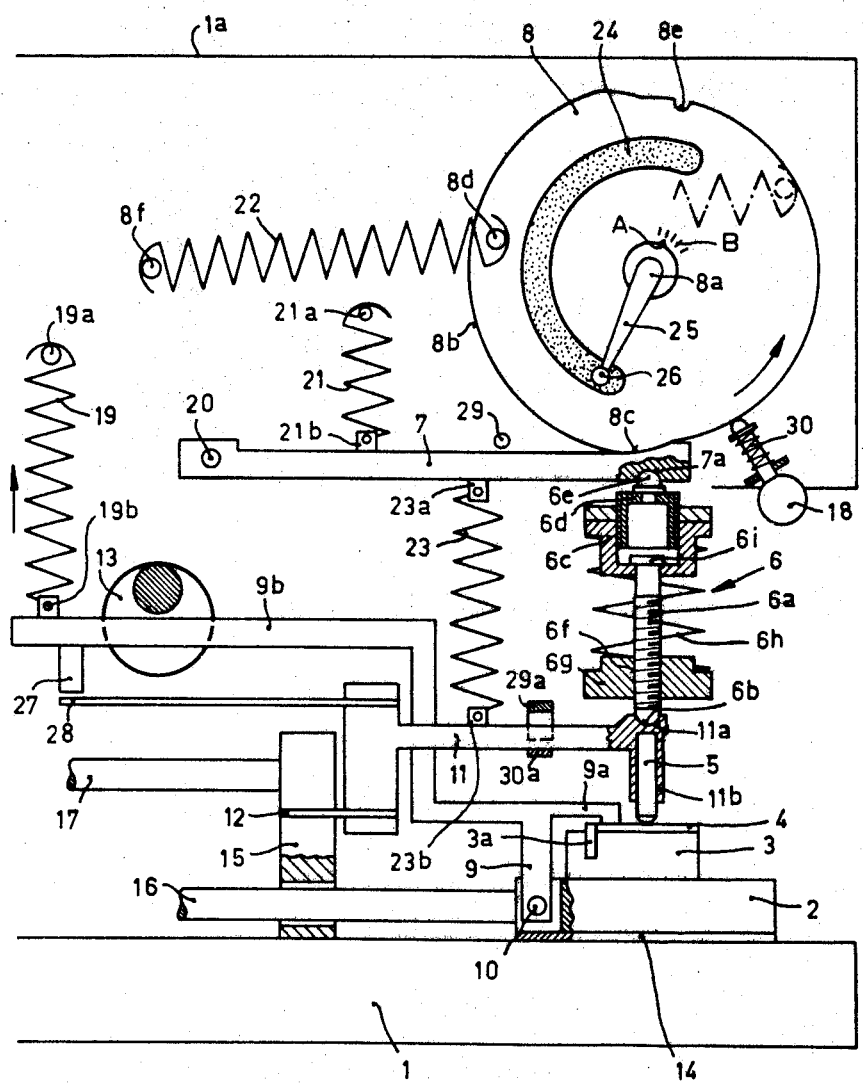
FIGURE 1 is a front elevational view of one embodiment of the present invention.

Considering first the embodiment of the invention shown on FIGURE 1, it comprises a frame 1a, a base plate 1 on which is secured a support 2 insulated therefrom and having thereon an insulated work-piece holder 3. Also mounted on work-plate 1 is a carrier 15 through which passes a welding current bar 16 and which is insulated from the carrier. Carrier 15 is connected with another welding bar 17. On support 2 is pivoted at 10 a lever 9 having a long branch 9b and a shorter branch 9a. This lever is electrically connected to current bar 16. Arm 9a of lever 9 is adapted to press work-piece 4 on to work holder 3 during welding and simultaneously serves as a current conductive member to lead current to member 4. The free extremity of arm 9b is urged upwardly by retractable spring 19 to press end 9a downwardly and thereby press work-piece 4 against holder 3. Carrier 15 has mounted therein an elastic single blade 12 connected with bar 17. This blade is secured in generally T-shaped arm 11 which at the free end thereof carries holder 11b for the other piece to be welded (5). This piece 5 is, as shown, a bolt which is to be welded to plate 4. On the upper surface of holder 11b is a concave surface 11a. Arm 11 also has for its purpose to conduct current to the piece to be welded 5. Arm 11 is thus vertically adjustable through the bending of blade 12.

The second lever 7 is pivoted on pivot 20 and its other extremity is in contact with spring assembly 6, preferably through its circular recess 7a which is so shaped as to cooperate with the complementarily shaped knob 6e forming the upper extremity of the spring assembly 6. A retractable spring 23 mounted on mounting stud 23a, 23b of lever 1 urges together these two levers. Another retractable spring 21 stretched between mounting stud 21b of lever 7 and 21a of frame 1a urges lever 7 upwardly. Suitably, the force of spring 21 is preselected with respect to the weight of assembly 6 so that the element to be welded 5 lies loosely on the other element to be welded 4. More exactly, the pressure with which part 5 presses on part 4 is equal to the difference between thte weight of the assembly and the force of spring 21.

In the present apparatus a cam-shaped flywheel 8 acts as the advancing means for advancing work element 5 towards the plate 4 to be welded therewith. As shown, this cam wheel has on its periphery a surface of generally cam-shape 8b adjacent to an incline flank 8c at one end thereof. FIGURE 1 shows the position of the apparatus of the invention when welding takes place. At the start of the welding operation lever 7 is at the position shown in the figure so as to give the possibility of lifting part 5 when the welding arc is initiated, but only up to an angle of pivoting limited by stop 29 positioned just above lever 7. To bring the cam wheel to ready position, it must be timed clockwise by pulling spring 22 to the position shown by the dotted line. Spring 22 is a return spring and is stretched between securing means 8d and 8f, on the flywheel and on the frame 1a, respectively. In the starting position, it is held by knob 18 which fits therein. Upon release of the flywheel, lever 7 is pushed downwardly pushing in its turn the spring assembly 6 in the same direction.

The electrical circuit of the present apparatus comprises the following elements:

On one side of flywheel 8 is secured a circular conductor member 24. Adjusting arm 25 rotatively mounted at 8a and having a hub provided with a marker A cooperating with a scale B has a contact member 26 forming with surface 24 a metallic switch serving to close the welding circuit to create an arc. Positioning of arm 25 and of marker A rigid therewith in predetermined position with respect to scale B permits to determine the angular position of the cam at which the circuit is closed a few microseconds before flank 8c will push the spring assembly 6 downwardly to thereby press the two parts to be welded and thus set off the welding arc.

In the preferred embodiment of the invention 6 generally designates a spring system. It should be understood, however, that the same is not essential to the invention, but merely leads to improved operation. Thus the invention contemplates the use of a flywheel such as 8 which would be in contact with the surface of work holder 11b. In the embodiment shown in FIGURE 1, spring system 6 consists of the bolt 6a having a threaded outer surface 6f on which is screwed a disk 6g which also serves as a retaining plate for spring 6h. The upper end of bolt 6a terminates in a head 6i which passes through the opening of a second cup-shaped disk 6c in which is force fitted a tube 6d having at the top thereof a rounded knob 6e and communicating with the cut part of disk 6c and having dimensions such that head 6i can move up to the extremity defined by the lower extremity of knob 6e. A return or compression spring 6h is stretched between 6c and 6g and normally urges them apart. The spring is pretensioned to an adjustable extent by turning disk 6g. Suitably the strength of spring 6h is selected so as to be greater than that of spring 23. In the normal position the two disks 6g and 6c have the greatest possible separation between them.

To facilitate the mounting and disassembly of the parts to be welded, 4 and 5, an eccentric 13 is mounted on frame 1a to cooperate with lever arm 9b. Thus when the user turns the eccentric with a crank (not shown) lever arm 9 is thus pivoted downwardly thus moving the other arm, 9a, upwardly and releasing parts 3 and 4 from mutual contact. Plate 4 can thus be positioned as desired by the user on work holder 3. Preferably work holder 3 has a recess in the shape of the work plate to be placed thereon. Also provided is a stop 3a which limits the movement of part 4. After this operation is achieved, the eccentric is returned to the position shown in the accompanying drawing, lever 9 under the urging of retractable spring 19 secured on stud 19a of frame 1a and stud 19b of arm 9b presses 9a on part 4. Simultaneously, electrical contact is made between this part and bar 16. Projecting member 27 of lever 9b presses on rod 28 which is in lever 11 thereby causing the same to lift owing to the presence of elastic blade 12 to thereby permit the introduction of the member to be welded (5), in this case a bolt, in holder 11b. The user of the apparatus then turns the eccentric to the position shown in FIGURE 1, so that bolt (5) lies loosely against part 4, as indicated before. Next, the user moves the flywheel to load spring 22 and bring it in the position shown in fragmental dotted lines where it is held by knob 18 which is retractable by means of spring 30, the top of which fits in recess 8e of the flywheel. In this position there is no contact between member 26 and the contacting track 24 and the welding circuit is opened. The operating current passes from part 4 to bar 16, pivot 10, and lever arm 9a. The current going to part 5 passes through bar 17, blade 12, lever 11 and cylindrical holder 11b. Thus bars 16 and 17 can be connected for example to the secondary winding of transformer T shown in FIGURE 3. The desired welding pressure is predetermined by adjusting spring 6h by means of plate 6g. When the flywheel 8 reaches a predetermined position set by positioning element 25, the switch, composed of parts 26 and 24, is closed. At the moment contact is made, there will be current flow with rapid heating, evaporation of metal and creation of welding arc, in known manner. There will also occur an explosive lifting up of element 5 under the action of the vapor pressure of the metal and electrodynamic forces. As the member 5 is thus lifted up, owing to the ability of member 11b to be resiliently pushed upwards there will occur a drawing of the welding arc. This drawing of the arc is most beneficial to the improvement of the quality of welds. To further support this drawing of the arc, there can be used auxiliary magnetic means such as elements 29a and 30a which represent respectively a fixed magnetic pole and a U-shaped member. Element 29a is secured onto lever arm 11. When element 5 is lifted up there is created a permanent magnetic field operating with the magnetic field of the current flow in known manner. A fraction of a second after the arc is drawn, crank 8c contacts lever 7 thus causing element 5 to be pressed against plate 4. This contact extinguishes the arc, stopping the welding action. The time interval between the ignition and the extinction of the arc is equal to the time necessary for making contact between elements 26 and 24 and the impact of the elements to be welded which is practically equal to the effective "burning" time of the arc in the way it is possible to obtain a burning time for the arc of even $10^{-3}$ to $10^{-4}$ seconds in a reproducible manner. To accelerate the process, the cam surface can be made steeper, thereby driving down element 5 a slightly greater distance. To cut down welding vibrations, a resilient pad can be secured under element 4.

Figure 2:
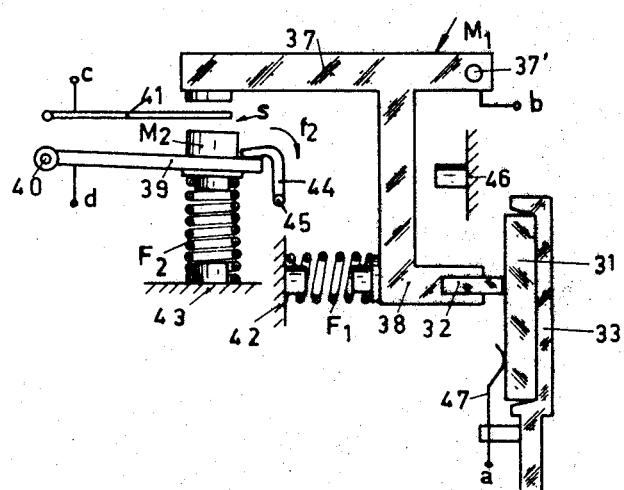
FIGURE 2 is a diagrammatic view of a variation thereof.

In the embodiment shown on FIGURE 2, work-piece 31, stationary during the welding operation, is a small plate, and the work-piece 32, which is to be welded on piece 31, is a short pin or bolt. Work-piece 31 is set up on a fixed work-table 33 rotatable on a horizontal spindle 34, so as to have the table rotate, after welding, to the horizontal position shown in dashed lines on FIGURE 2, where the unit of the two welded pieces is removed and a new plate 31 set in said table for the next welding operation. An upright position of table 33 during the welding operation is preferred because the operator, who stays at the right of the device, is protected by the table itself, and a special protecting screen is no longer needed. Moreover, small, red-hot, metal particles spurting from the welding-point, may freely fall down and not remain on work-piece 31. The spindle 34 of table 33 is pivoted in a bearing 35 which is in turn movable on horizontal rail 36 in the direction of double arrow $f_1$ with the table 33; thus it is possible, after the working operation and before the table 33 is rocked, to first pull the latter backwards, taking the pin 32 out of its support 38.

This work-piece support 38 forms the lower end of the vertical arm of a lever 37 journalled on the horizontal shaft 37' and conducts current to pin 32. The side of the lower end of the lever 37 facing to the left of FIGURE 2, is engaged by a coil spring F1 supported by a pin 42 normally urging said support 38 and pin 32 against the work-piece 31, under a predetermined welding pressure, all the parts of the device being shown in ready position.

Under the free horizontal arm of the lever 37, a second lever 39 is journalled on horizontal shaft 40 and is provided with a body M2. Body M2, which acts as an oscillating hammer, is operated by a normally stretched vertical coil spring F2 supported at its lower end by a stationary pin 43, said spring F2 normally is maintained in a compressed condition by a hook 44 hotating on the shaft 45 (arrow $f_2$) to release the hammer 39 and the body M2.

In the space between the body and the contact surface of the end of lever 37, there is located an elastic spring blade 41 which forms one contact of switch S for the welding circuit. The other contact of the switch is the body M2 itself, as in the embodiment of FIGURE 1.

To prevent spring F1 from being fully relaxed when work-table 33 is lowered, stop 46 is provided to limit the swinging of the lever 37 when urged by the spring F1. A contact blade 47 secured on table 33 and engaging the work-piece 31, serves to supply the current to work-piece 31. Thus the welding-circuit is, on one hand, connected to the wire-clamp $a$ of contact blade 47, and with the clamp $b$ of the lever 37 which suitably is made of a conductor material. When the current carrying means to the pin 32 is thus connected, the contact surface at the end of the horizontal arm of lever 37, which contacts blade 41 when the body M2 is released, is obviously insulated from said lever.

Figure 3:
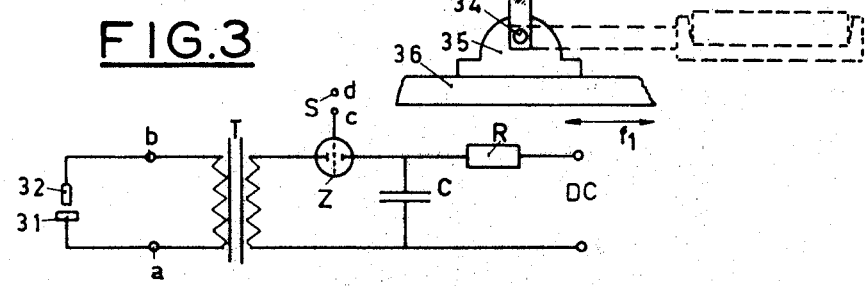
FIGURE 3 is a circuit diagram of a welding circuit.

The welding circuit according to FIGURE 3 is preferably the secondary of a transformer T where are located both connecting clamps $a$ and $b$ of FIGURE 2. A lighting tube Z is connected in series with a condenser C in the primary of transformer T, a switch S according to FIGURE 2 being located in the lighting circuit. FIGURE 3 also shows the clamps $c$ and $d$ of FIGURE 2 conducting to the switch-contacts constituted by the body M2 or the blade 41. Condenser C may be charged from a continuous current source through a resistance R.

Figure 4:
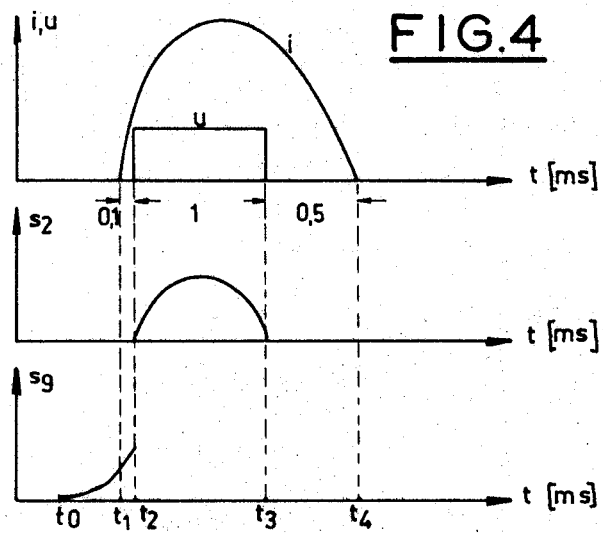
FIGURE 4 is a graph, the curves of which show the relationship between the time of welding and the welding current.

The functioning of the above-described device appears from the diagram illustrated on FIGURE 4. In the position shown on FIGURE 2, the device is ready for welding: spring F1 urges the pin 32 under a predetermined welding pressure, against work-piece 31 on table 33; movable body M2 is held notwithstanding the effect of spring F2 and locked by the hook 44. The condenser C (see FIGURE 3) is charged.

To start the welding operation, the operator merely releases hook 44 (time $t_{0_1}$ FIGURE 4), whereupon the body M2 moves towards the free end of the arm of the lever 37 and engages this end after a predetermined time proportionate to the weight of body M2 and the strength of the spring F2. The lower curve on FIGURE 4 shows diagrammatically the stroke $s9$ of body M2 as a function of welding time: at time $t1$, the body engages the blade 41 thus closing the switch S and consequently lighting the tube Z of FIGURE 3. Then, at the same time, $t1$ (FIGURE 4), due to the discharge of the condenser C, the current $i$ flows in the secondary of the transformer T through work-pieces 31 and 32, which are still in contact at this time. At moment $t2$, the body M2 vigorously engages the lever 37 with the blade 41 therebetween, and this blow results in rotating the lever on its shaft 39, the rotation being throguh a small angle in a clockwise direction, so that the pin 32 is slightly moved for a short time against the stress of the spring F1. At that very moment, $t2$, an arc is produced between the work-pieces 31 and 32, practically resulting, for a short time, in the arc-voltage $u$ (FIGURE 4).

The flow of discharge impulse $i$ from condenser C is negligibly altered by the arc, as the other resistances of the welding circuit are substantially higher than the resistance of the arc itself. Immediately after the recoil of pin 32, the pin is pushed back by the spring F1 towards work-piece 31, this motion occurring at moment $t3$ of FIGURE 4. The stroke $s2$ of pin 32 is also illustrated on said FIGURE 4 as a function of the time. When the pin 32 engages the work-piece 31 again, the arc voltage $u$ drops suddenly whilst the discharge impulse $i$ vanishes at moment $t4$. At the very time of body M2 engaging the lever 37, the spring F2 may be slack enough to unleash practically unaltered the action of spring F1 on the welding pressure; but it may be possible to limit the expansion of spring F2 by a stop-piece before the body M2 engages the lever 37, so as to have said body M2 merely "driven" by the back-remaining spring.

It is of course obvious that the lapse of time between $t1$ and $t2$, essential to the quality of the welding bonds, as well as to the proper arc-duration, namely between $t2$ and $t3$, may be most accurately predetermined and most of all also kept extraordinarily small, by a suitable choice of the strength of the springs F1 and F2, of the masses of the body M2 and M1 of the lever 37, as well as of the space between the plate 11 and body M2 when in their ready position.

In the embodiment of FIGURE 4, it is understood that the time-space between $t1$ and $t2$ (thus between closing switch S and the recoil of the pin 32 from the work-piece 31) is of 0.1 ms., while the arc duration is of 1.1 ms. before pin 32 again engages the work-piece 31.

It is essential that the arc be put out when the welding current $i$ has still a sufficient magnitude to still keep hot and fluid the work-piece areas to be welded when engaging each other. The example according to FIGURE 4 supposes that the putting out of the arc occurs after about the two thirds of the duration of the whole condenser's discharge.

The time interval between $t1$ and $t2$ provided by the claimed apparatus is much more reduced, accurate and reproducible than is the case with similar prior art devices.

The above device is advantageously mechanized in such a manner that, when the table 33 is rotated downwards to change work-pieces, body M2 is automatically stretched and locked again, and when the table is reset to its working position (upright) with a new work-piece, the operator merely needs to release the hook 44 without any adjustment or switching.

It should be noted also that body M2 may be a flywheel, lifting for a short time the movable lever 37 by means of a cam, while the switch S can be replaced by a release device located on the same shaft as the wheel (see FIGURE 1).

Moreover, the shaft 40 of body M2, the spring pin 43 with spring F2, the switch S as well as the release hook 44–45, may be arranged on common support freely rotating on shaft 39 of lever 37, thus controlling the self-adjustment of the whole device, independently of eventual changes of length of the pin to be welded.

The driving of the body M2 may be effected by means of any other convenient reserve of energy, e.g. of electromagnetic type, or may be by a motor.

Figure 5:
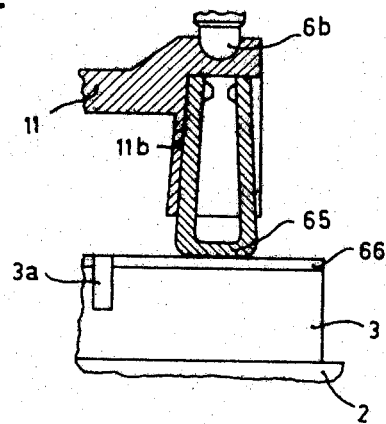
FIGURE 5 is a fragmentary view of a modified apparatus according to the invention which is suitable for the securing of stems to the backs of cuff links.
Figure 6:
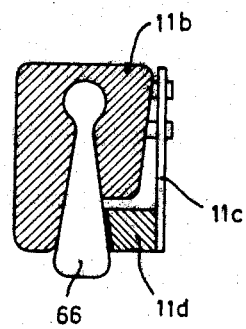
FIGURE 6 is an end view of the modification shown on FIGURE 5.

The apparatus according to the present invention is particularly suitable for the welding of the metallic leg to the plate of cuff-links. For this application, member 11$b$ of the embodiment of the invention shown on FIGURE 1 suitably may be shaped as shown on FIGURES 5 and 6 so as to receive therein the leg of the cuff-links 65 which is to be welded to the cuff-link plate 66. Suitably, the work-holder 11$b$ may comprise a metallic spring blade 11$c$ secured to a copper pressure element 11$d$ which grips in place leg 66 and additionally provides for a greater current conductivity. Because of the exceptionally beneficial working conditions provided by the use of the present apparatus, it is possible to employ legs and cuff-link plates which are already finished in the sense that they possess the ultimate aesthetic appearance they are intended to have, which will not be changed by the welding conditions.

Instead of short circuit ignition described in the example it is possible to have the two elements to be welded at an appreciable distance one from the other at the moment the swtch is closed by the advancing device. The ignition of the one can then be forced for instance by applying a HF pulse above the two electrodes or by HF superimposition on the welding current for creating the necessary ionization in the air gap. It is also known to have a sufficiently high overvoltage on the 2 electrodes which is higher than the breakdown voltage in the air gap.

The order of the closing of the switch and acceleration can be arbitrary. Thus it is possible to first push the moving element and then switch to give very short time intervals.

What is claimed is:

1. In an apparatus for welding small workpieces, including a welding current source of predetermined energy content such as a charged capacitor discharging in a current transformer, the workpieces being initially separated and in an arc initiation position; the improvement which comprises, a resilient support for one of said workpieces allowing further separation for the drawing out of the welding arc, a pivoted lever engaging said support, a rotary cam having a cam face adapted to engage said lever, spring means for imparting rotary movement for said cam, switching means actuated by said cam in a position prior to engagement of said lever for closing the circuit of the welding current source to said workpieces permitting their further separation by the dynamic force of arc initiation, thereby drawing out the arc, and upon engaging said lever pressing said resilient support to bring said workpieces together for the extenguishing of said arc.

2. In an apparatus for welding together two workpieces, a stationary support for one of said pieces, a holder movable with respect to said stationary support for holding the second workpiece, spring means biasing said movable holder, thereby urging both said workpieces into conductive contact, a current source comprising a secondary winding of a transformer, a condenser connected to the primary winding of said transformer including, in series, switching means for establishing said connection, charging means for said condenser, and an impact actuating means engaging said movable holder for momentarily separating said workpieces subsequently of the instant of actuating said switch means, thereby initiating an arc, said separation being for a time duration less than the total discharge time of said condenser through said secondary winding.

3. Apparatus in accordance with claim 2 wherein said impact actuating means comprises a body of predetermined mass propelled by the kinetic energy stored in a spring.

4. Apparatus in accordance with claim 2 wherein said impact actuating means comprises a body of predetermined mass propelled by the kinetic energy stored in a spring, said body actuating said switching means prior to engaging said movable holder.

5. In an apparatus for welding together two workpieces, a stationary support for one of said workpieces, a pivoted lever having at one end of one of its arms a holder for the second of said workpieces and at the end of its other arm an anvil, spring means engaging said first arm urging said lever toward said support, thereby placing said workpieces into current conductive engagement, an impact device comprising a bar pivoted at one end and having a striking head of predetermined mass attached to the other end, said head being so placed as to strike said anvil, spring power means for swinging said bar and a catch for releasing said power means, and a contact element actuated by said striking head.

6. Apparatus in accordance with claim 5 wherein said contact element is interposed between said anvil and said striking head for closure of a welding circuit by the swinging motion of said bar.

References Cited

UNITED STATES PATENTS

| | | | |
|---|---|---|---|
| 2,510,101 | 6/1950 | Graham | 219—95 |
| 2,798,936 | 7/1957 | Quinlan | 219—96 |
| 2,867,022 | 1/1959 | Chiappinelli | 24—102 X |
| 2,433,371 | 12/1947 | Klemperer | 219—113 X |
| 2,921,177 | 1/1960 | Gellatly et al. | 219—95 |
| 3,171,011 | 2/1965 | English | 219—98 |

JOSEPH V. TRUHE, Primary Examiner

M. C. FLIESLER, Assistant Examiner

U.S. Cl. X.R.

219—95